Sept. 2, 1952 — R. C. BRADLEY — 2,609,158
FILM REELING ASSEMBLY
Filed Dec. 24, 1947 — 2 SHEETS—SHEET 1

Roy C. Bradley
INVENTOR.

BY *Clarence A. O'Brien*
and *Harvey B. Jackson*
Attorneys

Sept. 2, 1952          R. C. BRADLEY          2,609,158
FILM REELING ASSEMBLY
Filed Dec. 24, 1947          2 SHEETS—SHEET 2
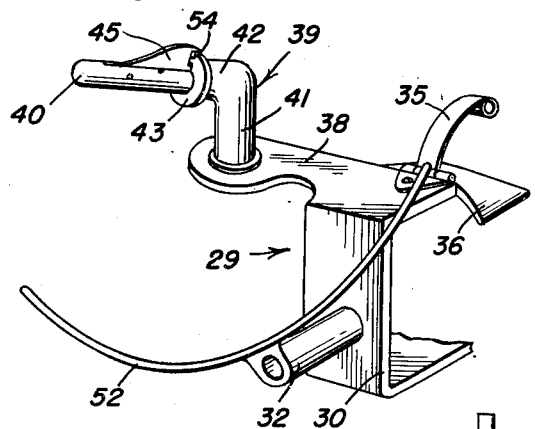
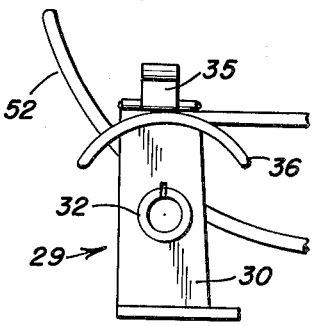
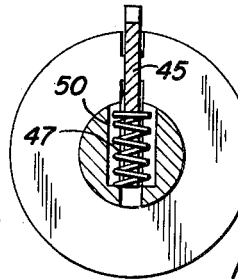
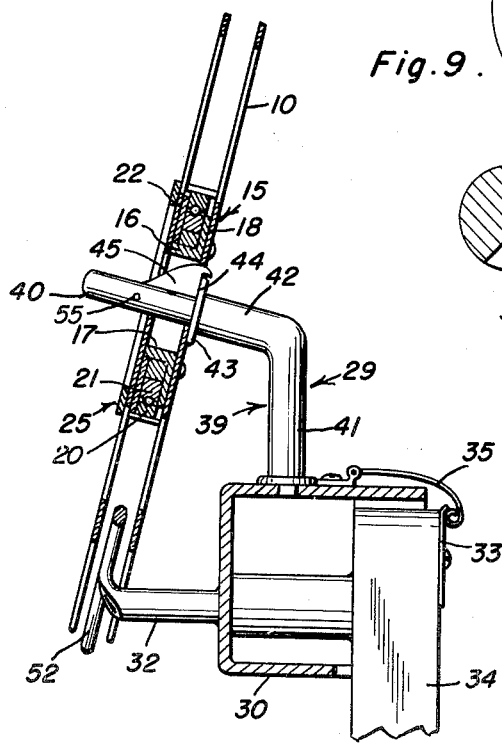
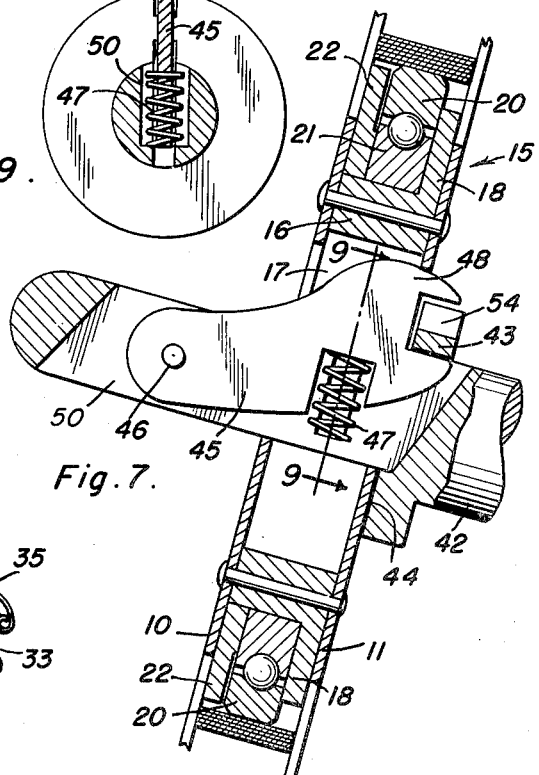
Roy C. Bradley
INVENTOR.

Patented Sept. 2, 1952

2,609,158

UNITED STATES PATENT OFFICE 2,609,158

FILM REELING ASSEMBLY

Roy C. Bradley, San Bernardino, Calif.

Application December 24, 1947, Serial No. 793,645

12 Claims. (Cl. 242—70)

1

This invention relates to film reels and its main object consists in providing a film reel from which the film may be unreeled with either of the two film ends leading.

Film reels eliminating the necessity of having to rewind the film after its passage through the projector have been proposed before. Such film reels are usually part of a magazine which holds those parts designed to become operative during unreeling starting at the inner film end. This type of construction in most cases has the general purpose to provide means relieving the pressure of the windings on its inner end with which winding started and of guiding the film into a plane which is at a distance from and parallel to the median plane of the film when wound on the reel.

Moreover the pressure relieving means usually employed, and consisting mostly of expansion devices, such as rollers guided in slots and moved outwardly upon displacement of a cam, involve a number of complex mechanisms, and therefore are expensive and likely to get out of order.

The invention has for its main object to provide a simple inexpensive and reliable means for unwinding the film with either end leading which involves merely certain changes in the reel, but does not entail corresponding further changes in the film magazine or projector and which is not based on mechanisms with interengaging moving parts.

A further object of the invention consists in providing a film reel winding assembly which brings the film reel into a position from which the film may be unwound in a plane which corresponds to the preselected plane in which the film moves through the projector.

A further object of the invention consists in providing a film reel unwinding assembly, consisting essentially of a reel with a freely movable central portion moving when the film is unwound at its inner end, and of means for holding the reel in such an inclined position that the film may be directly unwound and which essentially coincides with the main longitudinal plane in which the film moves through the projector.

A further object of the invention consists in providing removable means for winding the film which cover essential parts of the freely movable central members and which may serve as a base for winding the film, but may be withdrawn after this operation, if necessary.

A further object of the invention consists in providing a means for fixing the position of the reel on its inclined support so as to avoid imperfect seating which would impair the correct running off of the film from the reel into the plane of further movement.

A still further object of the invention consists in providing holding means for the film which do

2 not interfere with the limited lateral tripping or twisting of the film necessary to bring it from the inclined reel into the main longitudinal plane in which it passes through the projector, but which nevertheless provide a complete and positive support.

Further objects are more specific and will be best understood when referring to a more detained description of the invention and to the annexed drawings.

The inventive idea is capable of finding expression in a number of embodiments, one of which merely is shown by way of example in order to explain the principle of the invention and the best mode of applying this principle which has been contemplated. Modifications of the example shown, therefore, are not necessarily departures from the invention.

This invention is illustrated in the accompanying drawings in which:

Figure 5 is a perspective view of the unwinding support.

Figure 6 is an elevational sectional view of the reel and its unwinding support, the section being taken along a vertical plane passing through the center of the reel.

Figure 7 is an enlarged sectional elevational view of the central portion of the reel and its support, the section being taken along a vertical plane passing through the center of the reel.

Figure 8 is an elevational side view of the support.

Figure 9 is a sectional view of the central portion of the reel and support, the section being taken along line 9—9 of Figure 7.

Figure 1:
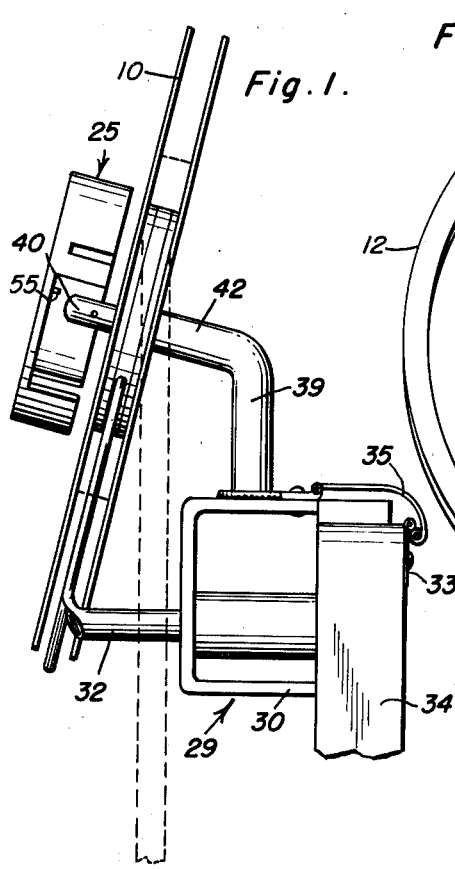
Figure 1 is an elevational side view of a reel and its unwinding support.
Figure 2:
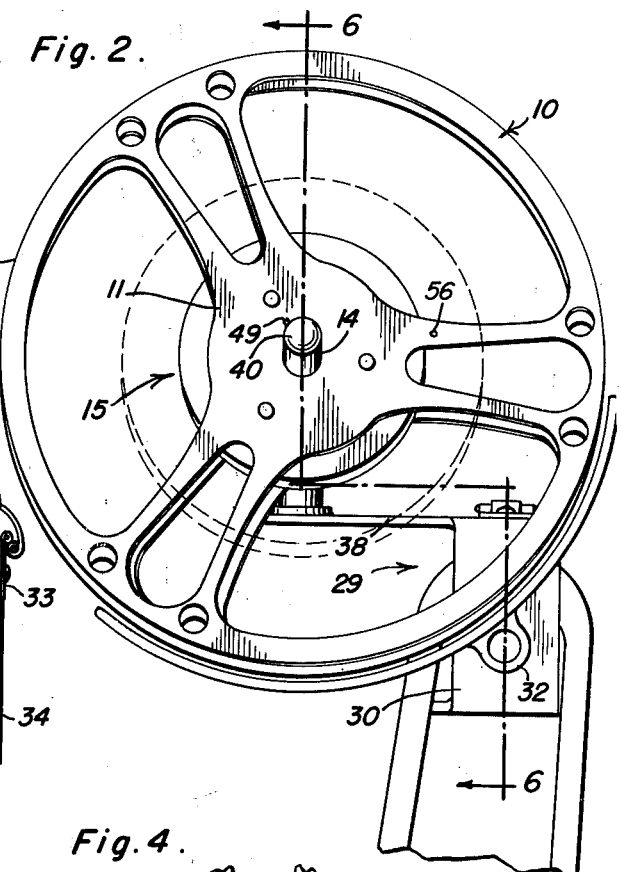
Figure 2 is an elevational front view of the structure shown in Figure 1.

The reel, according to the invention, consists of the two customary side plates 10 and of a hub member 15. The side plates 10 are preferably of spider formation and consist of a central disk 11 provided with an opening 14 for the insertion of a spindle and with spider arms supporting an annular rim 12 which parts may all be integral and form a single piece. The two side plates are attached to the hub member 15 by rivets or other suitable means in the customary way.

The hub member 15 consists of a central sleeve 16 surrounding a central opening 17 and provided with a flange 18. This sleeve supports an annular movable carriage hub member 20 running on balls which are supported by the inner annular bearing member 21. The latter is supported by and fits snugly over the sleeve 16. The flange of the sleeve is of a diameter which is markedly smaller than the diameter of the annular carriage hub member 20 and the width of the latter is smaller than the width of the film carried by it. The edge of the film, therefore, projects over the carriage hub member 20 and there is sufficient room for the film to be turned or twisted sideways when the film is guided in this direction.

A holding and spacing member 22 is seated on the sleeve 16 on the other side of the carriage hub member 20 which is of a diameter only slightly smaller than the diameter of member 20. The film therefore, will not be carried by this member when rolling out of the center. However the difference is so small that the film cannot be turned through an appreciable angle in this direction, so that no wedging in of the film can occur.

The members forming the hub 15 may all be held in their relative position by the side plates 10 and the rivets holding the same.

Figure 3:
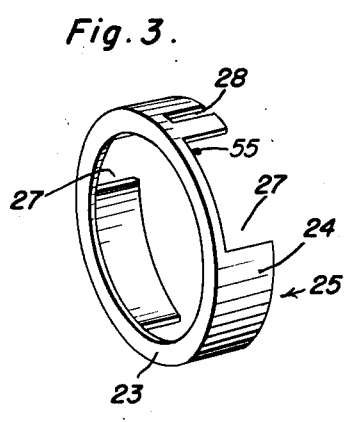
Figures 3 and 4 are a perspective and an elevational front view respectively of details.
Figure 4:
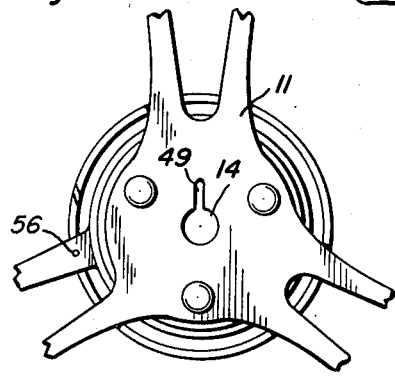

A winding sleeve 25 forming a separate removable member (Figures 1 and 3) is provided to support the film during the winding operation. This sleeve is cap like with an annular rim portion 23 carrying a cylindrical sleeve portion 24 which may be slipped over the carriage hub 20. The cylindrical portion is provided with cuts 27 which accommodate the spider arms when the winding sleeve 25 is in its operative position.

The cylindrical sleeve portion 24 is moreover provided with a slot 28 into which the inner end of the film is inserted and which serves to fix said end.

The reel, such as described, may be used in connection with any standard film or magazine and in connection with any standard projector and may be used in the customary manner after the film winding sleeve has been slipped over the hub member 15 from one side, which will hereinafter be called the front side of the reel. The film in this case is wound on the film winding sleeve and may be unwound in the usual way by starting from the outside.

In order to unwind the film from the inside, starting with the end which was first fixed on the reel, a reel supporting unwinding bracket 29 is used which brings the reel into a position in which it is inclined with respect to the vertical plane. The film when unwound from the inner side of the reel is guided in such a manner that its longitudinal axis remains in a vertical plane or in a plane coinciding with the plane of symmetry of the film gate and of the reels on which it is wound up at the other end of the projector.

The reel from which it is unwound, however, rotates in a plane inclined to the aforesaid plane and the film is therefore somewhat turned or twisted sideways with respect to the reel when leaving the same. It will be seen from Figure 1 that no special guides or appliances are necessary if the reel is brought into a correct inclined position and it is sufficient to exercise a longitudinal pull in the vertical plane in order to secure correct unwinding of the film from a reel which is in an inclined position. It will also be seen that this method brings the film into a plane which does no longer coincide with the plane of symmetry of the reel, thus fulfilling one of the main requirements for unwinding a film from the inner side of the reel.

The unwinding bracket shown in Figures 1, 2, 5, 6, and 8 comprises a U-shaped base member 30 provided with a tubular extension 32. The base member 30 is so shaped that it may accommodate the customary reel post 34 of the standard projector while the tubular extension 32 fits over the standard top spindle. An arcuate saddle portion 36 projecting from the base member may be provided which rests on the cylindrical portion of the reel post. No change in the projector construction is therefore necessary to use the reel according to the present invention. The sole change which is of a certain advantage consists in the fixing of a holding or catch plate 33 on the end face of the reel post by means of a screw. A spring clip or catch 35 may be pivotally mounted on the base member which is drawn over the catch plate 33 (Figures 1 and 6) and therefore holds the bracket firmly on the post preventing any accidental displacement.

The base member 30 is provided with a lateral extension 38 which carries a reel post 39 provided with a vertical and an inclined section 41, 42 respectively. The latter section carries the reel spindle 40 which is joined to the post in such a way that a step 44 results. A collar 43 at the end of the reel post section 42 may provide an additional resting surface for the reel.

The spindle 40 is slotted (at 50) near its end and a catch 45 is inserted into this slot which is pivoted (at 46) and is pressed upwardly by means of a spring 47. The head 48 of the catch engages the side wall of the reel and holds it firmly on the spindle in a position in which said side wall rests on the collar 43. The catch 45 thus holds the reel in the correct position in abutment against the collar of the post.

A slot 49 extending from the central opening 14 on one side of the reel permits the passage of the catch when the reel is slipped over the spindle and at the same time fixes the correct position of the reel with respect to the spindle, so that the delivery side of the reel is applied against the collar.

On the tubular stem 32, preferably clear of the said stem so as to permit the top spindle of the projector to protrude beyond the end of the tubular stem 32, a curved or arcuate film track and holder 52 is mounted which is applied against the outer side of the film during unreeling from the inside. The track 52 forms a support for the film reel, but is, in fact, rarely in actual use during the major part of the unwinding operation as most relatively tightly wound films do not expand until only a few windings remain. The film track 52 is provided to hold the film on the outside in the event that it should expand.

The film track covers preferably an arc which is larger than 90°. The outer part of the film which is in contact with the film track is emulsion covered, but is regularly a piece of blank film trailing the picture, so that actual contact is not of any consequence.

In operation, as has been already mentioned, the winding sleeve 25 is slipped over the film carriage hub 20, the end of the film is inserted with the slot and winding of the film takes place as usual, the reel being mounted in its winding position on the usual projector spindle with its middle plane in the plane of the film gate and of the other reels.

When unwinding from the outside takes place, the reel remains in this position and the film is unwound in the usual way.

When unwinding from the inside has to take place in which the film end first wound on the reel is again at the head of the film unwound from the reel the winding sleeve 25 is removed and the reel is placed on the spindle of the unwinding bracket 29, which has been placed previously on the film post 34, with its tubular stem 32 slipped over the spindle. The catch 45 is depressed—a slot 54 in the collar 43 facilitating the depression by the operator—and the reel is moved over the catch with the latter entering slot 49. When the reel is seated against the collar 43 the catch is released and holds the reel in an inclined position with respect to the post on the spindle 40. In this position the film track 52 is applied against the outermost layer of the film on the reel.

The removal of the winding sleeve 25 has loosened the inner portion of the film and the end of the film may be seized and may be inserted in whatever appliance has to receive the film. Usually the purpose of unwinding the film from the inside is to make it run again through the projector in the right direction. In this case the film is handled as usual, inserting it between the rollers, drawing it through the film gate and fixing it on the take up reel.

During unwinding the film is tipped and in a transversely inclined position on the carriage hub but leaves the reel in perfect alignment with the transportation and guiding means of the projector. The film lies on the rotating carriage hub and rolls off the center. The film does not drag or jam, as on the delivery side sufficient room has been provided for the film to run off in a transversely inclined position.

In order to provide more room for the running off of the film between the spider arms, one of the double spider arms may be cut away. It is also of assistance if a mark is applied to the winding sleeve and to the front side of the reel so that correct insertion is facilitated. Instead of a mark a pin 55 may be provided on the winding sleeve which enters the hole 56 on the central spider structure of one of the side plates 10 thereby positively preventing insertion in a wrong position and on the wrong side of the reel.

It will thus be seen that the reel as described is fit and may be used for both methods of unwinding and that no additional guiding or take-off means for the film have to be provided.

From the foregoing it will be clearly seen which constructive characteristics are essential and it is therefore clear that modifications or changes in the non-essential features will not affect the character of the invention.

Having described the invention, what is claimed as new is:

1. A film reel, comprising a hub member, side plates with central spider disks, spider arms and an annular rim carried by said spider arms, attached to said hub member, a carriage hub member concentric with said hub member and freely rotatable thereon, said carriage hub member being of a width smaller than the width of the film, and a removable winding hub member encircling said carriage hub member and, adapted to be fixed temporarily on said hub member, said removable winding hub member being provided with a cylindrical drum surface covering the freely rotatable carriage member and serving as a base for the film wound on the reel.

2. A film reel, comprising a sleeve like hub member with a central opening, provided with a lateral flange, side plates consisting of a central spider disk, spider arms and an annular rim portion carried by said spider arms, attached to said hub member, a rotatable carriage hub member concentric with and encircling said hub member, a bearing member for ball bearings concentric with and fixed on said sleeve like hub member, supporting said carriage hub member for free rotation, the latter being of a smaller width than the width of the film, and a removable winding hub member, adapted to be fixed temporarily on said hub member provided with means for covering the rotatable carriage member and for serving as a base for the film wound on the reel.

3. A film reel comprising a sleeve like hub member with a central opening provided with a lateral flange, side plates, consisting of central spider disks with spider arms and an annular rim portion carried by said spider arms, attached to said hub member, a bearing member with ball bearing races concentric with and carried by said sleeve like hub member in the plane of symmetry between said side plates, a rotatable carriage hub member, rotatable on ball bearings, running on said bearing member, said carriage hub member having a smaller width than the film width, and being spaced on one side from the side plate by the flange on the sleeve like member, said flange being of a diameter substantially smaller than the outer diameter of the carriage hub member, and a removable winding hub member, adapted to be fixed temporarily on said hub member provided with means for covering the rotatable carriage member and for serving as a base for the film wound on the reel.

4. A film reel comprising a sleeve like hub member with a central opening provided with a lateral flange, side plates, consisting of central spider disks with spider arms and an annular rim portion carried by said spider arms, attached to said hub member, a bearing member with ball bearing races concentric with and carried by said sleeve like hub member in the plane of symmetry between said side plates, a rotatable carriage hub member, rotatable on ball bearings running on said bearing member, said carriage hub member having a smaller width than the film width, and being spaced on one side from the side plate by the flange on the sleeve like member, said flange being of a diameter substantially smaller than the outer diameter of the carriage hub member, a further annular spacing member concentric with the sleeve member and fixedly attached thereto, of a diameter approximately equal to but slightly smaller than the outer diameter of the carriage hub member, and a removable winding hub member, adapted to be fixed temporarily on said hub member provided with means for covering the rotatable carriage member and for serving as a base for the film wound on the reel.

5. A film reel, comprising a hub member, side plates with central spider disks, spider arms and an annular rim carried by said spider arms, attached to said hub member, a carriage hub member concentric with said hub member and freely rotatable thereon, said carriage hub member being of a width smaller than the width of the film, and a removable winding hub member, the latter forming a unit having an annular rim portion and a cylindrical portion projecting therefrom, provided with cuts, the latter accommodating the spider arms, and the projecting cylindrical portions between the cuts, fitting into the space between the spider arms and covering substantially the outer surface of the carriage hub member, thus forming a base for the film wound on the reel, when the unit is slipped into its place from one side of the reel, one of said projecting portions being moreover provided with a slot for inserting the forward end of the film.

6. In a film winding assembly for unreeling a film in a preselected plane from a film reel starting with either film end, a film reel with a hub member, side plates with angularly spaced openings attached thereto, a carriage hub member freely rotatable on the said hub member, a removable cap like winding hub member adapted to be fixed temporarily on said film reel and provided with an annular attaching head and with axially projecting angularly spaced cylindrical flange sections, forming a cylindrical winding surface, covering the outer periphery of said carriage hub member with the angularly spaced flange sectoins fitting into the angularly spaced openings of the side plates, and a winding bracket adapted to hold said film reel in a position inclined with respect to the preselected plane of unreeling of the film from which the film may be unwound in the preselected plane.

7. In a film winding assembly for projectors provided with the customary posts and reel carrying spindles projecting therefrom, for unreeling films in a preselected plane defined by said projector, with either film end leading, a film reel with a hub member having a central opening, side plates consisting of central spider disks, spider arms and an annular rim attached to said hub member, a carriage hub member freely rotatable on said hub member, a removable winding hub member, adapted to be slipped over and to substantially cover the outer surface of said rotatable carriage hub member, and a winding bracket with a base member fitting over the projector post, a sleeve adapted to encircle the spindle carried by said projector post, an arm projecting from said base, a post carried by said arm and having an upper section inclined with respect to said post, a reel carrying spindle carried by said post, means on said base member for fixing its position on said projector post, and an arcuate film track carried by said projecting sleeve and spaced from said reel carrying spindle so as to be located between the side plate and to encircle part of the outer circumference of a film carried by the reel for serving as a support for said film, when unreeled with the inner film end leading.

8. In a film winding assembly as claimed in claim 7, wherein the inclined spindle carrying post section is provided with a collar forming a substantial step at its spindle carrying end.

9. In a film assembly as claimed in claim 8, wherein the spindle is provided with a spring pressed catch, adapted to fix the reel in a position on the spindle in which it abuts against the collar at the end of the post.

10. In a film winding assembly for projectors provided with the customary posts and reel carrying spindles projecting therefrom, for unreeling films in a preselected plane defined by said projector, with either film end leading, a film reel with a hub member provided with a central opening, side plates consisting of central spider disks, spider arms and an annular rim carried by said spider arms, said central spider disks being provided with a central opening and one of the spider disks being moreover provided with a slot projecting from said opening, a carriage hub member freely rotatable on said hub member, a removable winding hub member, adapted to be slipped over and to substantially cover the outer surface of said rotatable carriage hub member, and a winding bracket with a base member fitting over the projector post, a sleeve adapted to encircle the spindle carried by said projector post, an arm projecting from said base, a post carried by said arm and having an upper section inclined with respect to said post, a reel carrying spindle carried by said post, a collar at the end of the post carrying the spindle, said spindle being adapted to pass through the central openings of the spider disks, means on said base member for fixing its position on the projector post, an arcuate film track projecting from said base for supporting the film wound upon the reel during the unwinding operation with the inner side of the film leading, a spring pressed pivoted catch projecting from said spindle, entering through the slot in one of said spider disks for holding the reel on the spindle in its correct position against the said collar.

11. A film reel comprising a hub member, side plates provided with arcuately spaced openings, a carriage hub member, freely rotatable on the said hub member, and a removable cap like winding hub member with arcuately spaced axially projecting cylindrical flanges fitting into the arcuately spaced side plate openings forming a cylindrical hub surface encircling said carriage hub member and covering the same, said winding hub member serving as a base for winding the film on the reel.

12. In a film winding assembly as claimed in claim 1, a winding bracket comprising a base member, a substantially vertical post carried thereby, said post being parallel to the direction of unwinding of the film from the reel, a film reel carrying section on said post inclined with respect to the aforementioned post and to the direction of unwinding, a spindle carried by said inclined post section and coaxial therewith for carrying the film reel, and an arcuate film track carried by the said base and held on the outside of the reel with the arcuate film track inclined with respect to the direction of unwinding of the film at an angle which is at right angles to the inclination of the inclined post section, said arcuate section being thus parallel to a plane passing through the side plates of the reel when mounted on the inclined spindle.

ROY C. BRADLEY.

REFERENCES CITED

The following references are of record in the file of this patent:

UNITED STATES PATENTS

| Number | Name | Date |
|---|---|---|
| 959,675 | Woodworth | May 31, 1910 |
| 1,804,332 | Gentilnomo | May 5, 1931 |
| 1,853,301 | Davidge | Apr. 12, 1932 |
| 2,171,991 | Rall | Sept. 5, 1939 |
| 2,380,790 | Robertson | July 31, 1945 |
| 2,475,036 | Lopez-Henriquez | July 5, 1949 |

FOREIGN PATENTS

| Number | Country | Date |
|---|---|---|
| 160,542 | Great Britain | Mar. 21, 1921 |
| 487,800 | Germany | Dec. 1, 1927 |
| 749,704 | France | May 15, 1933 |